US008595949B2

(12) United States Patent
Reichow et al.

(10) Patent No.: US 8,595,949 B2

(45) Date of Patent: Dec. 3, 2013

(54) EYE ALIGNMENT TRAINING DEVICE WITH SLIDING MARKERS

(75) Inventors: Alan W. Reichow, Beaverton, OR (US); Herb Yoo, Beaverton, OR (US)

(73) Assignee: Nike, Inc., Beaverton, OR (US)

( * ) Notice: Subject to any disclaimer, the term of this patent is extended or adjusted under 35 U.S.C. 154(b) by 256 days.

(21) Appl. No.: 13/085,197

(22) Filed: Apr. 12, 2011

(65) Prior Publication Data

US 2012/0265110 A1 Oct. 18, 2012

(51) Int. Cl.
*G01B 3/10* (2006.01)

(52) U.S. Cl.
USPC .......................................... 33/756; 33/511

(58) Field of Classification Search
USPC .......................................... 33/755–760, 768
See application file for complete search history.

(56) References Cited

U.S. PATENT DOCUMENTS 2,711,030 A * 6/1955 Drew et al. ..................... 33/758
3,861,790 A 1/1975 Tamura
4,644,663 A * 2/1987 Needs ..................... 33/486
4,819,337 A * 4/1989 Noyes ..................... 33/414
5,036,613 A * 8/1991 Smith ..................... 33/756
5,050,982 A 9/1991 Meissner
5,083,380 A * 1/1992 Robertson ..................... 33/562
5,478,239 A 12/1995 Fuerst
6,742,892 B2 6/2004 Liberman
6,755,525 B2 6/2004 Reichow
6,811,258 B1 11/2004 Grant
6,893,127 B2 5/2005 Reichow
7,073,208 B2 7/2006 Penque
7,698,832 B2 * 4/2010 Sacks ..................... 33/755
7,726,812 B2 6/2010 Daie
7,819,527 B2 * 10/2010 Bardenstein et al. ......... 351/225
7,900,370 B1 * 3/2011 Treige ..................... 33/770
2004/0254036 A1 12/2004 Smith
2006/0288599 A1 * 12/2006 Hajianpour ..................... 33/755
2007/0046895 A1 3/2007 Levinrad
2009/0021698 A1 * 1/2009 Bardenstein ..................... 351/245
2009/0313844 A1 * 12/2009 Swanson et al. ................ 33/756

(Continued)

OTHER PUBLICATIONS

Reichow, et al., "Introduction to Behavioral Optometry", Sports Vision, 1993, 75 pages, Optometric Extension Program Foundation, United States.

(Continued)

*Primary Examiner* — Yaritza Guadalupe-McCall

(74) *Attorney, Agent, or Firm* — Shook, Hardy & Bacon L.L.P.

(57) ABSTRACT

The present invention generally relates to an eye alignment training device that may be used to train and improve an individual's ability to align their vision. In using this device, a base piece of the device is held by the user, a connector may extend from the base piece while another end of the connector may be secured, for example, to a wall. Between each end, sliding markers slideably positioned on the connector may have various visual characteristics. For example, each marker may be of a different color. The markers may be moved to different locations on the connector, and the subject may move his focus between the various markers. When not in use, the connector may be stored in a cavity within the base piece, such as by being wound around a groove in the base piece, retained within a gap in the base piece, or retained within a cavity enclosed within the base piece. The device may have a retraction mechanism which retracts the connector into the cavity of the base piece.

20 Claims, 3 Drawing Sheets

(56) References Cited

U.S. PATENT DOCUMENTS

| | | | | |
|---|---|---|---|---|
| 2011/0078914 A1* | 4/2011 | Swanson et al. | ................ | 33/756 |
| 2011/0131008 A1* | 6/2011 | Swanson et al. | ................ | 33/756 |
| 2012/0265110 A1* | 10/2012 | Reichow et al. | ................ | 601/37 |

OTHER PUBLICATIONS

Ferreira, "An Overview of Research in Sports Vision: its History and an Optometric Perspective", The South African Optometrist, Dec. 2003, pp. 142-149, vol. 62, No. 4, Auckland Park, South Africa.

Coffey, et al., "Visual Performance Enhancement in Sports Optometry", Sports Vision 1995, pp. 158-177, Butterworth-Heinermann, United States.

Cardall, "Contact Lenses in Sport: a General Overview", Optician, Jan. 13, 2006, pp. 22-25, vol. 231, No. 6034, United States.

Rouse, et al., "A Comparison Study of Dynamic Visual Acuity Between Athletes and Nonathletes", Journal of the American Optometric Association, Dec. 1988, pp. 946-950, vol. 59, No. 12, United States.

Koenig, "Practicing Perception: Eyes Can Be Trained to be More Effective", USA Today Baseball Weekly, 1996, 3 pages, United States.

Coffey, et al., "Optometric Evaluation of the Elite Athlete," Problems in Optometry, Mar. 1990, pp. 32-59, vol. 2, No. 1, United States.

Reichow, et al., "A Comparison of Contrast Sensitivity in Elite Athletes Versus a Normal Population", American Journal of Optometry and Physiological Optics, Dec. 15, 1986, vol. 63, No. 82, United States.

Farrow, et al., "An Investigation of the Effectiveness of Bolle's Competivision Sport-Glasses on Tennis Performance", Clinical and Experimental Optometry, Jul.-Aug. 2000, pp. 226-231, vol. 83, No. 4.

Herdman, et al., "Computerized Dynamic Visual Acuity Test in the Assessment of Vestibular Deficits", The American Journal of Otology, 1998, pp. 790-796, vol. 19, No. 6, United States.

Tian, et al., "Dynamic Visual Acuity During Transient and Sinusoidal Yaw Rotation in Normal Ulilaterally Vestibulopathic Humans", Experimental Brain Research, Feb. 8, 2001, pp. 12-25, vol. 137, Springer-Verlag, United States.

Reichow, et al., "Ultraviolet and Short Wavelength Visible Light Exposure: Why Ultraviolet Protection Alone is Not Adequate", Journal of Long-Term Effects of Medical Implants, 2006, pp. 315-325, vol. 16, No. 4, Begell House, Inc., United States.

International Search Report and Written Opinion of Aug. 3, 2012 for PCT/US12/33042.

* cited by examiner

EYE ALIGNMENT TRAINING DEVICE WITH SLIDING MARKERS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to visual training. More particularly, the present invention relates to a visual training device.

BACKGROUND OF THE INVENTION

Within vision training and testing, eye alignment is an area that, if weak, may hinder the subject when participating in various activities, such as sports, where eye alignment is helpful in tracking an object, such as a ball. To improve eye alignment, various tests may be used in training to exercise this particular visual skill.

BRIEF SUMMARY OF THE INVENTION

The present invention generally relates to an eye alignment training device that may be used to train and improve an individual's ability to align their vision. In using this device, one end of the device is held by the user, while another end is secured, for example, to a wall. Between each ends, a connector may comprise sliding markers of various visual characteristics. For example, each marker may be of a different color. The markers may then be moved to different locations on the connector, and the subject moves his focus between the various markers. When not in use, the connector may be wound around one end of the device, or the device may have a retracting mechanism, which retracts the connector into the body of one of the end pieces.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1B:
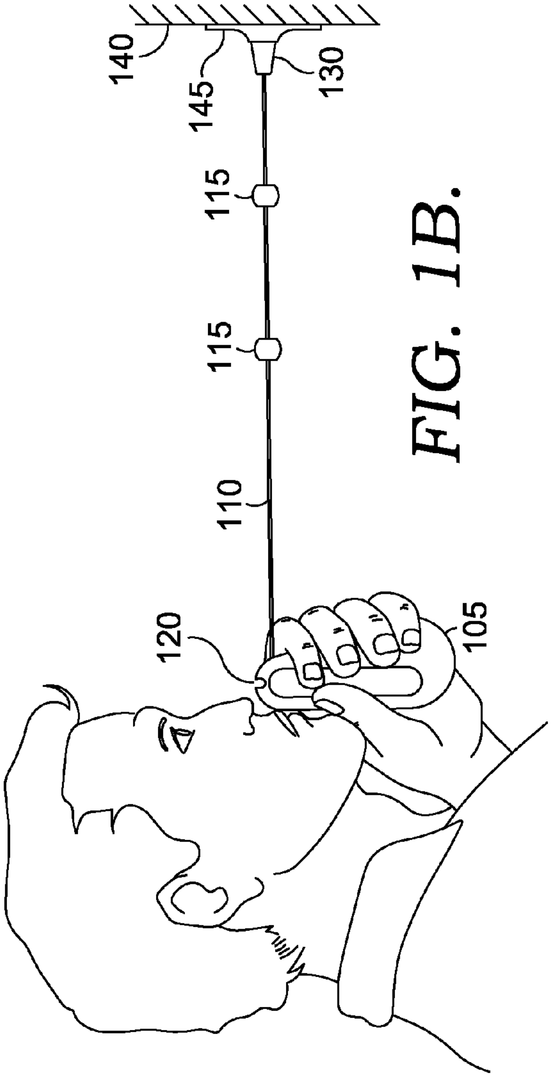
FIGS. 1A-1B illustrate an example of an eye alignment training device in accordance with the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Broadly speaking, eye alignment may be improved by performing eye alignment exercises. For example, a string, slender rope, tape or other substantially linear connector may be extended from near a subject's eyes to a relatively distant point, such as a point on a wall at least several feet away, and the subject may sequentially focus upon different points along the connector, which will require that the subject's eyes be aligned with a different vergence angle required for successful focusing at each point. This exercise may be facilitated by providing movable sliders, such as beads, that may be moved along the connector and used as focus points by the subject.

The present invention provides an eye alignment training device that may be easily deployed, used, stored, and transported. For example, simply using a string and beads to train a subject's eye alignment can present numerous challenges. When deploying a simple string, the string often cannot be readily affixed to a wall or other point. Further, using a simple string and beads can present challenges in use, as a simple string may be uncomfortable or even difficult to hold properly proximate to the subject's eye. Using a simple string and beads may yet further present challenges to store and/or transport, as the string can easily become knotted, tangled, snagged, etc.

Systems in accordance with the present invention provide eye alignment training devices that are simple to deploy, use, store, and transport. Eye alignment training systems in accordance with the present invention provide a connector, which may be a string, slender rope, tape, or other elongated material. The connector may be stored within a cavity in a base piece when not in use. In accordance with the present invention, the base piece may retain the connector by permitting the connector to be wrapped around a groove in the exterior of the base, by permitting the connector to be stored within a cavity enclosed within the base, or by some combination of wrapping the connector around the exterior of the base and storing the connector within the base. Slidable markers may be movably positioned on the connector, and may likewise be stored on or within the base piece. The base piece may be configured to be easily held by the subject and/or to be easily mounted at the distant end of the training device. In its extended configuration, an end piece may be located on the end of the connector opposite the base piece. The end piece may be configured to be easily held by the subject and/or to be easily mounted at the distant end of the training device. In this way, one of either the end piece or the base may be affixed at a relatively distant point, and the other may be grasped by the subject near his or her eyes, with the connector extended between the base and the end piece. The slidable markers may be positioned at one or more desired locations along the length of the connector, and the subject may then perform eye alignment focusing exercises using one or more of the positioned slidable markers as a focus point.

Generally, one end of the connector will be positioned at approximately the nose of an individual and the other end of the connector will extend to a wall or other steady object at a distance of at least several feet, and ideally ten or more feet, from the subject. In that way, slidable markers may provide focus points at distances varying from very near the subject's eyes, which will require a very high vergence angle, to at or near "optical infinity" from a subject, at which point a subject's eyes should ideally be parallel. In use, a subject may determine that he/she has properly focused on a given marker that is not at optical infinity because the connector will appear to "cross" at the connector serving as the current focus point when the subject has successfully focused on that marker.

A variety of configurations may be used for the base and end piece to permit them to be easily held by the subject and/or affixed at a relatively distant point. Additionally, a variety of configurations of the base may be used to permit the connector and slidable markers to be retained around and/or within the base. Some exemplary configurations of the base and end piece, as well as other exemplary aspects of eye alignment training devices in accordance with the present invention, are described in more detail below.

Figure 1A:
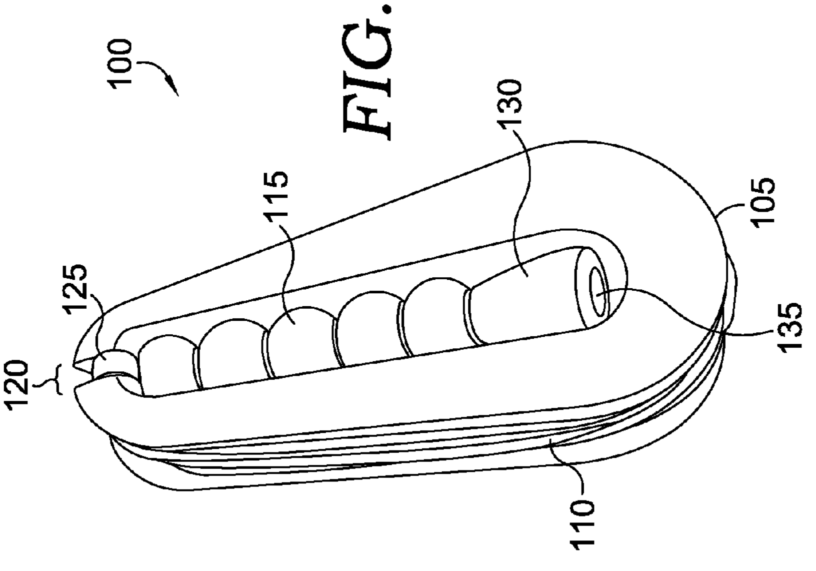

Turning now to FIGS. 1A-1B, an eye alignment training device 100 with sliding markers is provided. The training device 100 includes a base piece 105, a connector 110, and sliding markers 115. FIG. 1A shows the training device 100 in a storage mode whereby the connector 110 is contained within cavities of the base piece 105. That is, the connector 110 is illustrated wrapped around the base piece 105 in a groove provided on the perimeter of base piece 105, and the sliding markers 115 and the portion of connector 110 occupied by markers 115 and end piece 135, are stored in a cavity comprising a gap 120 within the base piece 105. Any number of sliding markers 115 may be used in accordance with the present invention. The illustrated example shown in FIG. 1A shows five such sliding markers 115. The sliding markers 115 may be of any desired size or shape, depending on the use of the device, but each sliding marker 115 may possess a visual characteristic (e.g., a color or pattern) that allows a subject to differentiate between each sliding marker. Further, each marker is capable of sliding or moving down the connector 110, as shown in FIG. 1B.

At the end of the connector opposite base piece 105, an end piece 130 is provided. Such an end piece 130 may be fixed on the connector 110 and may provide a stopper to the sliding markers 115. Additionally, as shown in FIG. 1B, end piece 130 may be secured to the connector and used to connect or stabilize the end of the connector 110 to a wall 140 or other substantially solid object (not illustrated). As shown in FIG. 1B, the end piece 130 has a protrusion 135 at its far end, which detachably mates with a corresponding recess (not illustrated) in a fastener such as wall plate 145 is used to detachably tether the connector 110 to a wall plate 145 that is attached to wall 140. End piece 130 and wall plate 145 may utilize a pair of attractive magnets (not illustrated) to facilitate detachably affixing end piece 130 to wall plate 140. A plurality of wall plates 145 may be utilized to permit connector 110 to be stretched in a variety of angles and inclinations relative to subject. End piece 130 may be utilized as a visual marker itself, or alternatively may be used solely to tether the end of connector 110 opposite from base 105

Figure 2A:
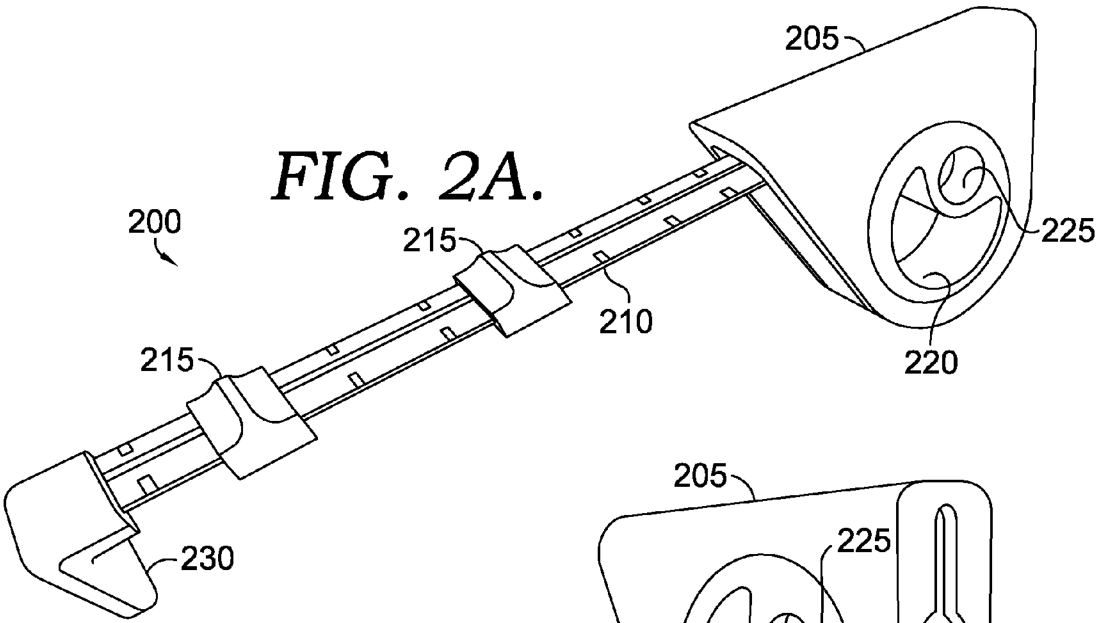
FIGS. 2A-2D illustrate a further example of an eye alignment training device in accordance with the present invention.
Figure 2C:
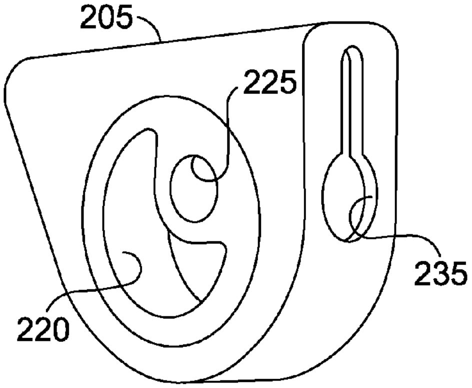
Figure 2B:
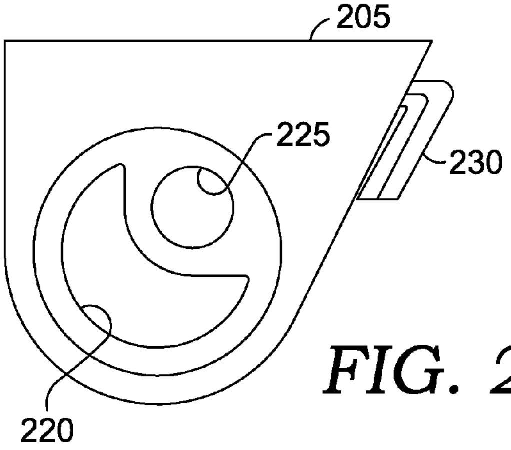
Figure 2D:
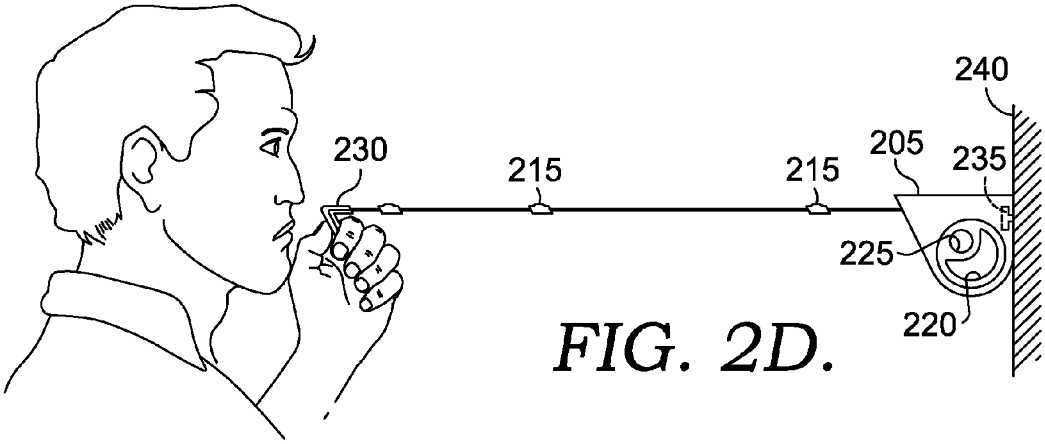

Turning now to FIGS. 2A-2D, another embodiment in accordance with the present invention is illustrated. In this example, the device 200 includes a base piece 205, a connector 210, sliding markers 215, and an end piece 230. As with the previous example, any number of sliding markers may be used with this embodiment. As shown in FIG. 2A, the connector 210 is extended. In this embodiment, the connector 210 is able to retract into an enclosed cavity contained within the base piece 205, as is shown in FIGS. 2B and 2C. The retraction mechanism within the base piece 205 allows the device 200 to assume an overall compact shape for storage. The retracting mechanism may comprise openings, such as opening 220 and 225, that may be used to wind the connector 210 within the base piece 205. The base piece 205 also may include an opening 235 at the end of the base piece 205 opposing the connector 210 and end piece 230. Opening 235 may be used to secure the device, as is illustrated in FIG. 2D.

In this example, the device 200 is attached to wall 240 using opening 235, which may slide over a fastener that is affixed to wall 240 to detachably mate the opening 235 and the fastener. The subject may then extend the connector 210 by holding onto the end piece 230.

Figures 3A, 3B, 3C, 3D:
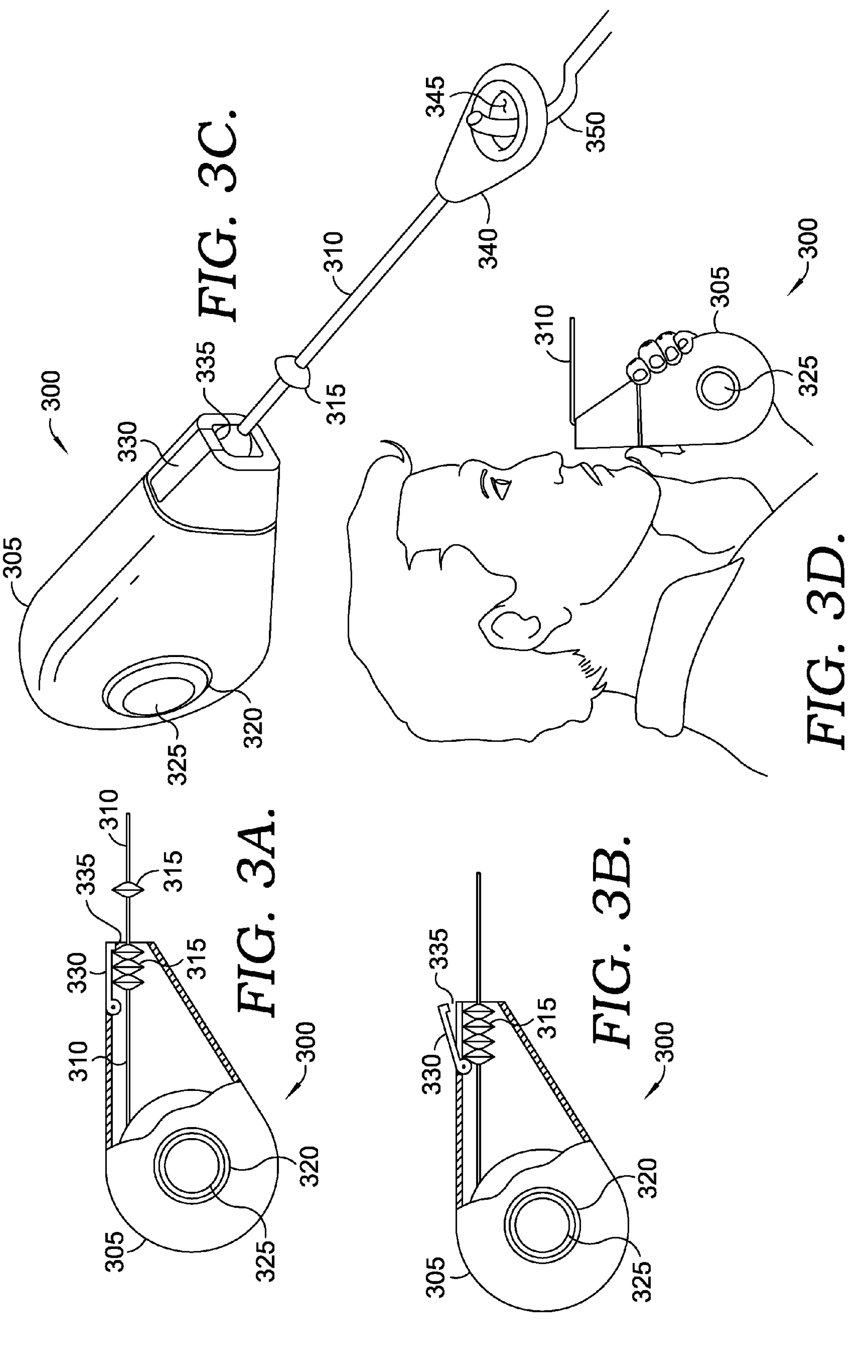
FIGS. 3A-3D illustrate a further example of an eye alignment training device in accordance with the present invention.

Turning now to FIGS. 3A-3D, another embodiment of an eye alignment training device 300 in accordance with the present invention is provided. In this embodiment, the training device 300 includes a base piece 305, a connector 310, sliding markers 315, and an end piece 340. This embodiment is capable of retracting the connector 310 into a cavity enclosed within the base piece 305 via the opening 335. The retraction mechanism within the base piece 305 may be powered by a spring assembly or any other mechanism and may be initiated by pressing the button illustrated at 325. Further, in this embodiment, the button 325 may individually release each sliding marker 315 using door 330. With each depression of button 325, the door 330 may raise, thereby allowing one or more sliding marker 315 to exit the cavity within the base piece 305 at opening 335. On the other hand, while door 330 is lowered slideable marker 315 is retained within cavity of base piece 305. FIG. 3B illustrates such an example prior to a sliding marker being released. And, FIG. 3A shows a sliding marker 315 on the connector 310 that has just been released from the opening 335.

Although any method of connected or securing the connector may be used with any of the embodiments illustrated and discussed herein, FIG. 3C shows an end piece 340 with an opening 345. A fastener such as a hook, shown as 350, may be used to secure the end piece 340 by detachably mating the hook 350 with the end piece 340, and thus the connector 310 and training device 300. The hook 350 may be affixed to a wall or any other location where training may occur. In using this embodiment, the subject may secure the end piece 340, as shown in FIG. 3C, and then may extend the connector 310 with the sliding markers 315, and hold the device 300 under the nose so that the connector 310 and sliding markers 315 are within his line of sight.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. An eye alignment training device used to train the eye alignment of a subject, comprising:

a base piece;

a connector having a first end and a second end, the first end affixed to the base piece and the second end adapted to be detachably affixed to an object located at a first distance from the base piece;

a plurality of sliding markers affixed to the connector that are capable of moving to locations along the connector; and a cavity within the base piece configured to contain at least a portion of the connector which the second end is not affixed to an object, wherein the cavity comprises a groove provided on the perimeter of the base piece; and wherein the connector and plurality of sliding markers are capable of retracting into the body of the base piece when the device is not being used for training.

2. The eye alignment training device of claim 1, further comprising a fastener securable to the object located at a first distance from the base piece, the fastener secured to the second end of the connector to detachably tether the second end of the connector to the object to which the fastener is secured.

3. The eye alignment training device of claim 2, further comprising and end piece coupled to the second end of the connector, the end piece detachably mating with the fastener to detachably tether the second end of the connector.

4. The eye alignment training device of claim 3, wherein the fastener comprises a hook.

5. The eye alignment training device of claim 3, wherein the fastener comprises a plate having a recess that receives the end piece.

6. The eye alignment training device of claim 5, wherein the plate and the end piece further comprise a pair of magnets.

7. The eye alignment training device of claim 3, wherein the cavity comprises a gap within the base piece.

8. The eye alignment training device of claim 3, wherein the cavity comprises a groove provided on the perimeter of the base piece and a gap within the base piece.

9. The eye alignment training device of claim 8, wherein the gap is configured to contain the slideable markers and the portion of the connector occupied by the slideable markers and the groove is configured to contain at least a portion of the connector when the second end is not affixed to an object.

10. The eye alignment training device of claim 3, wherein the cavity comprises an enclosed cavity contained within the base piece.

11. The eye alignment training device of claim 3, further comprising a retraction mechanism that winds connector within base piece.

12. The eye alignment training device of claim 11, wherein the retraction mechanism comprises at least one hole used to wind the connector within base piece.

13. The eye alignment training device of claim 11, further comprising a button that activates the retraction mechanism.

14. The eye alignment training device of claim 13, wherein the retraction mechanism is powered by a spring assembly.

15. The eye alignment training device of claim 13, further comprising a door that may raise to allow a sliding marker to exit the cavity.

16. The eye alignment training device of claim 15, wherein the door when lowered retains the sliding markers within the cavity.

17. The eye alignment training device of claim 16, wherein depressing the button raises the door.

18. The eye alignment training device of claim 2, wherein the connector may extend at least ten feet.

19. An eye alignment training device used to train the eye alignment of a subject, comprising:

a base piece;

a connector having a first end and a second end, the first end affixed to the base piece and the second end adapted to be detachably affixed to an object located at a first distance from the base piece;

a plurality of sliding markers affixed to the connector that are capable of moving to locations along the connector; and a cavity within the base piece configured to contain at least a portion of the connector which the second end is not affixed to an object, wherein the cavity comprises a gap within the base piece; and wherein the connector and plurality of sliding markers are capable of retracting into the body of the base piece when the device is not being used for training.

20. An eye alignment training device used to train the eye alignment of a subject, comprising:

a base piece;

a connector having a first end and a second end, the first end affixed to the base piece and the second end adapted to be detachably affixed to an object located at a first distance from the base piece;

a plurality of sliding markers affixed to the connector that are capable of moving to locations along the connector;

a cavity within the base piece configured to contain at least a portion of the connector which the second end is not affixed to an object;

wherein the connector and plurality of sliding markers are capable of retracting into the body of the base piece when the device is not being used for training; and a door that allows each of the plurality of sliding markers to exit the cavity.

* * * * *